(12) United States Patent
Xu et al.

(10) Patent No.: US 10,200,666 B2
(45) Date of Patent: Feb. 5, 2019

(54) COHERENT MOTION ESTIMATION FOR STEREOSCOPIC VIDEO

(71) Applicant: Dolby Laboratories Licensing Corporation, San Francisco, CA (US)

(72) Inventors: Ning Xu, Irvine, CA (US); Georgios Georgiadis, Burbank, CA (US); James E. Crenshaw, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 269 days.

(21) Appl. No.: 15/041,982

(22) Filed: Feb. 11, 2016

(65) Prior Publication Data

US 2016/0261845 A1 Sep. 8, 2016

Related U.S. Application Data

(60) Provisional application No. 62/128,399, filed on Mar. 4, 2015.

(51) Int. Cl.
| | |
|---|---|
| *H04N 13/00* | (2018.01) |
| *G06T 7/269* | (2017.01) |
| *G06T 7/285* | (2017.01) |
| *H04N 13/139* | (2018.01) |
| *H04N 13/128* | (2018.01) |
| *H04N 13/144* | (2018.01) |

(52) U.S. Cl.
CPC ........... *H04N 13/144* (2018.05); *G06T 7/269* (2017.01); *G06T 7/285* (2017.01); *H04N 13/128* (2018.05); *H04N 13/139* (2018.05); *G06T 2207/10021* (2013.01); *H04N 2013/0085* (2013.01)

(58) Field of Classification Search
CPC ........... G06T 2207/10021; G06T 7/269; G06T 7/285; H04N 13/0022; H04N 13/0029; H04N 13/0033; H04N 2013/0085
USPC ..................................................... 375/240.01
See application file for complete search history.

(56) References Cited

U.S. PATENT DOCUMENTS

| | | | | |
|---|---|---|---|---|
| 6,262,409 B1 * | 7/2001 | Avaro | ....................... | G06T 7/97 |
| | | | | 250/208.1 |
| 7,760,911 B2 * | 7/2010 | Xiao | ...................... | H04N 19/61 |
| | | | | 348/162 |
| 8,395,709 B2 * | 3/2013 | Hong | ................. | H04N 13/0029 |
| | | | | 348/43 |
| 8,411,931 B2 * | 4/2013 | Zhou | ................. | H04N 13/0029 |
| | | | | 375/240.16 |

(Continued)

FOREIGN PATENT DOCUMENTS

WO 2015/130616 9/2015

OTHER PUBLICATIONS

Baker, S. et al "A database and evaluation methodology for optical flow" International Journal of Computer Vision, 2011, pp. 1-31.

(Continued)

*Primary Examiner* — Deirdre L Beasley

(57) ABSTRACT

Methods and systems for enhancing motion estimation are disclosed for stereoscopic video sequences. The motion vector parameters and disparity values for consecutive frames may be calculated to estimate motion in a coherent manner between two channels, such as a left channel and a right channel in stereoscopic images. Occlusion handling is also applied to improve the estimation.

17 Claims, 3 Drawing Sheets

(56) References Cited

U.S. PATENT DOCUMENTS

| | | | | |
|---|---|---|---|---|
| 8,611,642 | B2* | 12/2013 | Wang | G06K 9/00208 |
| | | | | 382/154 |
| 8,810,635 | B2* | 8/2014 | McNamer | H04N 13/021 |
| | | | | 348/50 |
| 9,648,347 | B1* | 5/2017 | Cheng | H04N 19/51 |
| 2011/0074927 | A1* | 3/2011 | Perng | H04N 13/0239 |
| | | | | 348/46 |
| 2011/0110583 | A1* | 5/2011 | Zhang | G06T 7/579 |
| | | | | 382/154 |
| 2012/0014614 | A1* | 1/2012 | Takahashi | H04N 19/60 |
| | | | | 382/238 |
| 2012/0127267 | A1* | 5/2012 | Zhang | G06T 7/0071 |
| | | | | 348/43 |
| 2013/0129192 | A1* | 5/2013 | Wang | H04N 13/0011 |
| | | | | 382/154 |
| 2013/0147911 | A1* | 6/2013 | Karsch | H04N 13/026 |
| | | | | 348/43 |
| 2013/0147915 | A1* | 6/2013 | Wiegand | H04N 13/0048 |
| | | | | 348/43 |
| 2013/0215220 | A1* | 8/2013 | Wang | H04N 13/021 |
| | | | | 348/43 |
| 2013/0249944 | A1* | 9/2013 | Raghoebardayal | G06T 19/006 |
| | | | | 345/633 |
| 2014/0002441 | A1* | 1/2014 | Hung | G06T 7/593 |
| | | | | 345/419 |
| 2014/0028797 | A1* | 1/2014 | Hattori | H04N 13/0029 |
| | | | | 348/43 |
| 2014/0341292 | A1* | 11/2014 | Schwarz | H04N 19/597 |
| | | | | 375/240.16 |
| 2015/0201212 | A1* | 7/2015 | Zhang | H04N 19/52 |
| | | | | 375/240.15 |
| 2016/0182893 | A1* | 6/2016 | Wan | G06T 7/593 |
| | | | | 348/50 |
| 2016/0191795 | A1* | 6/2016 | Han | G06T 3/4038 |
| | | | | 348/36 |
| 2016/0232684 | A1* | 8/2016 | Kholodenko | G01S 17/89 |
| 2017/0013275 | A1* | 1/2017 | Liu | H04N 19/176 |

OTHER PUBLICATIONS

Basha, T. et al. "Multi-view scene flow estimation: A view centered variational approach" IEEE Conference on Computer Vision and Pattern Recognition, Jun. 13-18, 2010, pp. 1506-1513.

Brox, T. et al. "High Accuracy Optical Flow Estimation based on Theory for Warping" European Conference on Computer Vision, 2004, vol. 3024, pp. 25-36.

Bruhn, A. et al. "Lucas/Kanade meets Horn/Schunck: Combining local and global optic flow methods" International Journal of Computer Vision 61(3), pp. 211-231, 2005.

Chambolle, A. "An Algorithm for Total Variation Minimization and Applications" Journal of Mathematical Imaging and Vision 20, pp. 89-97, 2004 @ Kluwer Academic Publishers, Manufactured in The Netherlands.

Drulea, M. et al "Total variation regularization of local-global optical flow" IEEE Conference on Intelligent Transportation Systems, Washington, D.C. USA, Oct. 5-7, 2011, pp. 318-323.

Horn, B.K.P. et al "Determining optical flow" Artificial Intelligence, 1981, pp. 185-203.

Huguet, F. et al "A variational method for scene flow estimation from stereo sequences" IEEE 11th International Conference on Computer Vision, Oct. 14-21, 2007, pp. 1-7.

Lucas, B. et al. "An iterative image registration technique with an application to stereo vision" International Joint Conferences on Computer Vision, vol. 2, pp. 674-679, 1981.

Vedula, S. et al. "Three-dimensional scene flow" The Proceedings of the Seventh IEEE International Conference on Computer Vision, vol. 2, Sep. 20-27, 1999, pp. 722-729.

Wedel, A. et al "Efficient dense scene flow from sparse or dense stereo data" European Conference on Computer Vision, vol. 5302 of the series Lecture Notes in Computer Science pp. 739-751, 2008.

Xu, L. et al "Motion Detail Preserving Optical Flow Estimation" IEEE Transactions on Pattern Analysis and Machine Intelligence, vol. 34, Issue 9, pp. 1744-1757, Dec. 13, 2011.

Zach, C. et al "A duality based approach for realtime TV-L1 optical flow" Proceedings of the 29th DAGM conference on Pattern recognition. 2007, pp. 214-223.

Feng, Y. et al "Object-Based 2D-to-3D Video Conversion for Effective Stereoscopic Content Generation in 3D-TV Applications" IEEE Transactions on Broadcasting, vol. 57, Issue 2, pp. 500-509, Jun. 2011.

Liu, Ai-Ling, et al "New Error Concealment Algorithm of Macroblock Loss in Stereoscopic Video Right-View Image" Aug. 2013.

Vogel, Christoph et al "3D Scene Flow Estimation with a Piecewise Rigid Scene Model" International Journal of Computer Vision, Kluwer Academic Publishers, vol. 115, No. 1, Feb. 24, 2015, pp. 1-28.

Miled, W. et al "A Variational Framework for Simultaneous Motion and Disparity Estimation in a Sequence of Stereo Images" IEEE International Conference on Acoustics, Speech and Signal Processing, Apr. 19, 2009, pp. 741-744.

Wang, Q. et al "A Globally Optimal Approach for 3D Elastic Motion Estimation from Stereo Sequences" Computer Vision, Springer Berlin Heidelberg, pp. 525-538, Sep. 5, 2010.

* cited by examiner

COHERENT MOTION ESTIMATION FOR STEREOSCOPIC VIDEO

CROSS REFERENCE TO RELATED APPLICATIONS

The present application claims the benefit of priority from U.S. Provisional Patent Application Ser. No. 62/128,399, filed on Mar. 4, 2015, and may be related to PCT Patent Application No. PCT/US2015/017110, "SYSTEMS AND METHODS TO CONTROL JUDDER VISIBILITY", filed on Feb. 23, 2015, each of which is incorporated herein by reference in its entirety.

TECHNICAL FIELD

The present disclosure relates to video processing. Particularly, it relates to coherent motion estimation for stereoscopic video.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
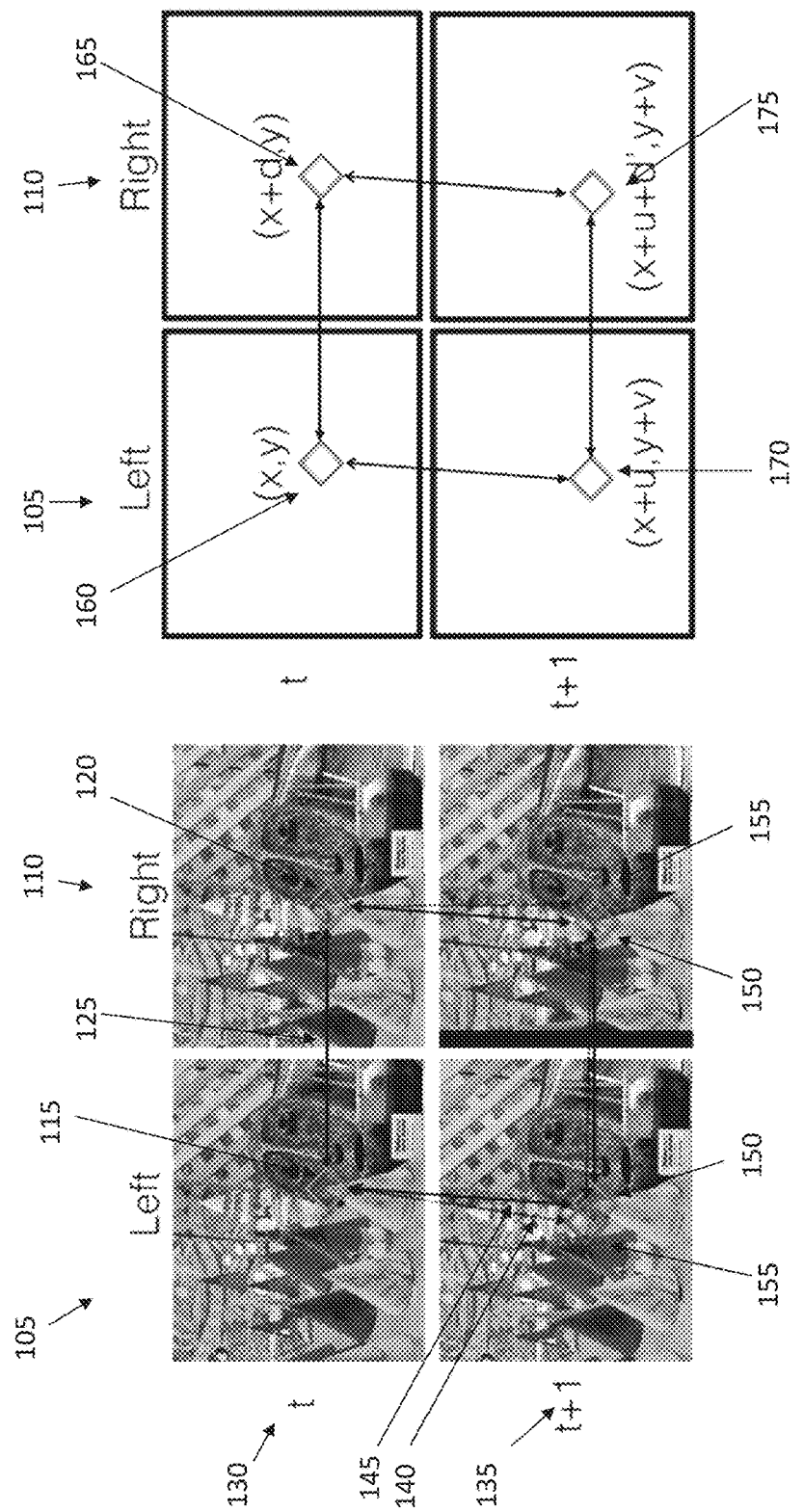
FIG. 1 illustrates coherent motion estimation in two channels and consecutive time frames.

In a first aspect of the disclosure, a method to estimate motion of pixels in an image pair with a computer is described, the method comprising: providing, by a computer, a first and a second video frame at a first time value, the first and the second video frames forming a stereoscopic image at the first time value; generating, by a computer and for at least one pixel, a first disparity value for the at least one pixel between the first and second video frames; storing the first disparity value in a first memory location; generating two motion vector parameters for the at least one pixel between the first and second video frames and a third and a fourth video frame at a second time value, the third and the fourth video frames forming a stereoscopic image at the second time value; storing the two motion vector parameters in a second memory location; generating a second disparity value for the at least one pixel between the third and fourth video frames at the second time value; storing the second disparity value in a third memory location; estimating a coherent motion of the at least one pixel, based on the first disparity value, the two motion vector parameters, and the second disparity value; and storing estimated coherent motion values in a fourth memory location, wherein the estimating a coherent motion of the at least one pixel comprises minimizing a cost function.

DETAILED DESCRIPTION

Motion estimation is a fundamental Computer Vision (CV) problem. It is important in real world applications ranging from low level tasks such as video coding and tracking, to higher level tasks such as action recognition, video segmentation and scene understanding. Motion estimation can be carried out in stereo image sequences (3D), where left and right images are provided to create a 3D video or image. Other than correct motion estimation, another relevant concept for image quality is motion smoothness.

Judder in a motion picture can be simply described as non-smooth motion, but the term is also used to generally describe any consequences of the relatively low frame rate of 24 fps typical in video recording. In the present disclosure, judder may be alternatively referred to as motion smoothness. Some of the resulting distortions, compared to the motion visible in the real-world, due to the frame rate of 24 fps (or other similarly low frame rates) can be broken down into four main components: 1) non-smooth motion (chattering), 2) flickering along moving edges, 3) spatial blur on moving objects, and 4) false multiple edges.

Such distortions are primarily due to a high degree of motion relative to the image update rate (frame rate), as well as consequences originating from spatio-temporal aliasing. As known to the person skilled in the art, the visibility of motion distortions can be described by the spatio-temporal contrast sensitivity function (CSF), referred to as the ST-CSF. The contrast of the object in motion relative to its surrounding areas can affect the visibility, since the contrast is the main input variable into the ST-CSF, determining threshold and overall visibility.

There is also an effect on the visibility of these distortions based on the luminance adaptation of the human visual system. For higher luminance levels, the spatial and temporal bandwidths of the ST-CSF increase, with the consequence that the visibility of all four components also increases. New projector designs for cinema are enabling higher maximum luminance and higher contrast. Sometimes the increased maximum luminance is used to raise the average luminance level, and other times it is used to only increase the object's contrast. Both of these improvements have a negative side effect, in that they increase the visibility of all four components of judder. Unfortunately, the previously acceptable levels of judder can now become objectionable.

In other words, content graded for 100 nits standard dynamic range displays or 48 nits film screen shows objectionable judder when re-graded to extended or high dynamic range displays, for example, an 800-nits TV display or a 110 nits film screen with higher contrast. The reason is that higher brightness and higher contrast increase judder perception, as shown in psychophysical experiments.

Psychophysical experiments have studied how different factors affect the perception of motion judder, using Gabor and customized contrast-frequency test patterns as well as real image sequences as stimuli. The results show that judderness can have a strong relationship with different variables including the frame rate, motion speed, brightness, contrast, shutter angle, etc. There exists a cut-off frame rate for perception of judder: beyond this frame rate, there is no judder perception, while below this rate, judder perception increases when frame rate decreases. At the same frame rate, judder perception increases as the motion speed, brightness, and contrast increases, and decreases as the shutter angle increases.

In many imaging applications, the goal of improvements in motion quality is to reduce all four judder components as enumerated above, and the window of visibility provides a clear path toward such improvement. One way to reduce judder is to increase frame rate or to reduce spatial and temporal resolution at the capture or display stage. However, for cinema, some of these components are actually desired at certain amplitude levels, as they contribute to the 'film look' often desired by cinematographers and other professionals in the movie industry. They are important in making cinema look different from video, which due to its relatively higher frame rate has much smoother motion, and sharp moving edges. While some of the details behind the preferences of the film look are unknown, it has been supposed that the motion blur (due to a hold-type blur and smooth pursuit eye movement interaction often discussed in the LCD display industry) is preferred for similar reasons to those related to the fact that the cinema practitioners often prefer a shallow depth of field for focus. It reduces visible details unnecessary to the storytelling, which could be considered distractions. Other theories are that cinema should not be too realistic, as that hinders the imagination of the viewers. A third key theory is that there is a strong association by filmgoers with some of the judder components towards the film look, and as a consequence, film viewers prefer movies not to have the more realistic motion quality of video. Due to these complex factors, methods are needed that do more than simply remove judder (such as by increasing the frame rate of capture and display, or by using motion interpolation to increase the frame rate of a given source). Such methods must manage judder; that is, keep the desirable components perceptually similar to the traditional cinema despite the increase in contrast and luminance levels. These approaches to judder management are the subject of the present disclosure. In addition to preserving the judder component levels at the previously acceptable levels for cinema, the present disclosure describes systems and methods that can allow the director or cinematographer to control aspects of the judder appearance, ranging from the traditional look to the more natural 'video motion' look, including various states in between, both globally and locally.

Common post production methods of masking judder are as follows:

1. Lowering overall picture brightness level until judder is acceptable. This method is in conflict with the desire for higher brightness and higher contrast in displays, and artificially constrains artistic intent.

2. Adding motion blur to fake a longer shutter on the camera, which smears pixels based on the amount and direction of motion. This method can have a negative impact on the details present in the scene, where all objects moving would lose details. To obviate this potential problem the minimal amount of motion blur is added, which may not work for future display technology. In fact, the amount of pure blur necessary to hide juddering may be so large that it violates a physically plausible camera shutter, adding a new negative appearance to the film.

3. Interpolating between images to a higher frame rate, or capturing at a higher frame rate, where the motion from frame to frame is reduced. This method is the preferred mode for most solutions, currently, however, this method also has a negative psychological impact on the scene where people remark that it no longer "feels" like film. This method may also not be possible with some display technologies.

As described above, addressing juddering in 24 fps high dynamic range content playback can improve picture quality. Dejuddering of 3D content, though, can benefit from improvements in motion estimation. The present disclosure describes methods and systems based on algorithms that improve motion estimation. The methods of the present disclosure estimate scene flow fields for the 3D scene points represented by their projections onto two stereoscopic videos, thus providing joint estimation of optical flow for the stereo image sequences. The methods described herein are different from previous scene flow frameworks as they utilize the local properties as well as the global variational settings of optical flows. The methods described herein also generalize an optical flow framework to scene flow methods. Additionally the present disclosure also introduces occlusion handling mechanisms in the scene flow framework.

The motion estimation methods described herein are applied to stereo image sequences. Motion estimation can therefore be carried out for the left and right channels. The person skilled in the art will understand that different choices for the left and right channel may be taken. For example, the left and right channels may be leftmost and rightmost, with respect to a center of the image, or may be other degrees of distance relative to the center of the image. The method of the present disclosure estimates optical flow fields for the two channels (left and right) that are coherent with each other by estimating the two channels jointly. In other words, the motions of the two channels are estimated in the same step. The optical flow fields for the two channels are linked together through scene flow, a property of the scene. Scene flow corresponds to the motion of points in the 3D space and can be parametrized in the image plane by the optical flow and the stereo disparity fields. The parametrization of the scene flow can be recovered simultaneously through a coarse-to-fine optimization scheme that utilizes (i) the local properties of Lucas/Kanade to increase the robustness of the optimization and (ii) the variational setting of Horn/Schunck to globalize the optical flow and disparity fields in untextured areas. The optimization can be further refined by introducing an occlusion handling mechanism that discounts the influence of occluded pixels. This algorithm can outperform state-of-the-art scene flow estimation techniques both in terms of accuracy and of speed.

Optical flow is the pattern of apparent motion of objects, surfaces, and edges in a visual scene caused by the relative motion between an observer (such as, for example, an eye or a camera) and the scene. In other words, optical flow is a two-dimensional motion field in the image plane. Optical flow can be considered, under certain assumptions, as the projection of the three-dimensional motion of the world onto the two-dimensional plane of the image. On the other hand, scene flow is the three-dimensional motion field of points in the world, just as optical flow is the two-dimensional motion field of points in an image. The optical flow can be considered as the projection of the scene flow onto the image plane of a camera. Transparent and glossy scene-surfaces or changes in illumination (such as shadows) can introduce a difference between the motion of objects in the world and the apparent motion. Therefore, optical flow is often analyzed under the assumption of Lambertian reflectance. Lambertian reflectance is the property that defines an ideal matte, or diffusely reflecting, surface. Ideal diffusive surfaces are non glossy.

As noted above, in general motion estimation is different from optical flow estimation. The two coincide when three assumptions are satisfied: (i) Lambertian reflection, (ii) Constant illumination and (iii) constant visibility. In the present disclosure it is assumed that these three assumptions are met when estimating the scene flow, unless stated otherwise. Optical flow estimation methods can generally be categorized into global and local methods. Global methods are typically inspired by the variational model originally proposed by Horn and Shunck, as in Reference [7], whereas local methods stem out from the work of Lucas and Kanade, as in Reference [9].

The Lucas-Kanade method, as generally known in the art, is a differential method for optical flow estimation which assumes that the flow is essentially constant in a local neighborhood of the pixel under consideration. The Lucas-Kanade method solves the basic optical flow equations for all the pixels in that neighborhood, by the least squares criterion. The Horn-Schunck method of estimating optical flow, as generally known in the art, is instead a global method which introduces a global constraint of smoothness to solve the aperture problem. As known to the person skilled in the art, the aperture problem is a type of uncertainty in estimating motion which can be encountered when insufficient information is provided to determine motion unambiguously. Variations in the Lucas-Kanade and the Horn-Schunck methods have been developed, as known in the art. The present disclosure describes methods which combine certain characteristics of both the Lucas-Kanade and the Horn-Schunck methods.

In some embodiments, the present disclosure aims at estimating optical flow between two consecutive frames in stereoscopic video sequences for the purpose of dejuddering. As discussed above, juddering occurs when there is high rate motion in a video induced by either fast moving objects or a fast moving video camera, while recording at low frame rates (e.g. 30 Hz). Juddering can cause edges to appear in monoscopic videos and cube-like structures in stereoscopic ones. Dejuddering typically requires first estimating the motion vectors between consecutive images and then subsequently interpolating a frame between the two images at a desired time instant.

In stereoscopic video sequences, motion estimation and interpolation are performed on both channels (e.g., left and right channels). This requires that the motion vectors estimated for the two channels are coherent between each channel. Corresponding points in the left and right channels have attached motion vectors that take them to corresponding points in the left and right channels, respectively, at the next time instant. A discrepancy, or lack of coherence, between the predictions for the two channels can cause image artifacts perceivable when the two channels are viewed by left and right eyes respectively. This concept is illustrated for example in FIG. 1.

In FIG. 1, a left channel (105) and a right channel (110) are visible. A first point in the image, taken as an example, is illustrated, for example the tip of a cone for the left channel (115) and the right channel (120). A disparity (125) between the two channels is illustrated. The two channels are depicted at time t (130) and time t+1 (135).

FIG. 1 illustrates the necessity of coherent optical flow estimation in stereoscopic video sequences. Errors in optical flow estimation in the left and right channels cause a change in disparity from t (130) to t+1 (135) that is incompatible with the scene. This causes the interpolated video to exhibit an unnatural phenomenon. The incoherent motion vectors are shown in FIG. 1 with dashed lines (140), whereas the correct and coherent motion vectors are shown with the solid lines (145). In FIG. 1, it is apparent that the correct points (150) correctly correspond to the tip of the cone, while the incorrectly estimated points (155) do not correspond to the tip of the cone.

The four points in the four frames for the left (105) and right (110) channels, for times t (130) and t+1 (135) can be labeled as (x,y) (160); (x+d,y) (165), where d is the horizontal disparity between left and right channels; (x+u, y+v) (170); and (x+u+d',y+v) (175), where d' is the horizontal disparity at t+1, and u and v are the estimated motion vector parameters for the point under consideration.

When errors in the motion estimation of the left and right channels are exhibited, such errors can cause an unnatural change in the disparity, which affects the quality of the interpolated video frame pair. Coherent motion estimation aims at minimizing this effect. Therefore, the present disclosure describes a scene flow model based on four equations, with four unknowns: the motion vector parameters (u,v) and disparity values d and d' at t=0 and t=1 respectively. An iterative solution is described herein. For example, ten or more iterations may be used. In addition, a method to adjust the results for occluded pixels is also described.

In some embodiments, to solve the problem of incoherent motion estimation for pixels of an image, as illustrated in FIG. 1, an optimization criterion for the motion estimation can be applied. For example, a criterion can measure the accuracy of the motion estimates in the left and right channels, and the consistency of the motion estimates between the left and right channels. In some embodiments, the criterion can be expressed as a mathematical quantity W to be minimized as:

$$W = \|e_l\|^2 + \|e_r\|^2 + \|e_d\|^2, \quad (1)$$

for each pixel (x,y), where $e_l$ is the error in motion estimation in the left channel, $e_r$ is the error in motion estimation in the right channel, and $e_{d'}$ is the error in the disparity at time t+1. It is possible to set $e_l \triangleq \hat{L}_1 - L_{1_{GT}}$ and $e_r \triangleq \hat{R}_1 - R_{1_{GT}}$, where $\hat{L}_1$ and $\hat{R}_1$ are the estimated locations of pixels in left and right channels and $L_{1_{GT}}$ and $R_{1_{GT}}$ are the ground truth locations at time t+1. It is possible to set $e_d \triangleq \hat{d}_{GT} = e_l - e_r$, where $\hat{d} = \hat{L}_1 - \hat{R}_1$ is the estimated disparity at time t+1 $d_{GT} = L_{1_{GT}} - R_{1_{GT}}$ is the ground truth disparity at the same time instant. To minimize W, an equivalent cost function to be minimized can be used. In some embodiments, the cost function to be minimized is $$E_{CLG\text{-}TV\text{-}SF} = E_{data} + E_{smooth}, \quad (2)$$

where the data term $E_{data}$ can be written as $$E_{data} = E_l + E_r + E_{d'} + E_d, \quad (3)$$

and similarly as in equation (1), $E_l$ represents the error in motion estimation in the left channel, $E_r$ represents the error in motion estimation in the right channel, $E_d$ represents the error in motion estimation in the disparity at time t, and $E_{d'}$ represents the error in motion estimation in the disparity at time t+1. The smoothness term $E_{smooth}$ can be written as $$E_{smooth} = \|D\nabla u\|_{TV} + \|D\nabla v\|_{TV} + \|D\nabla d\|_{TV} + \|D\nabla(d')\|_{TV} \quad (4)$$

where the smoothness term can also be referred to as a regularizer term as it smoothes the four motion estimates u, v, d and d', which have been described above; $D(\|\nabla I\|) = e^{-\alpha\|\nabla I\|^\beta}$ is a diffusion coefficient, where $\alpha$ and $\beta$ are fixed model parameters; and $\|I\|_{TV}$ refers to the total variation norm.

In some embodiments, the cost function (2) can be split into different simpler functions which can be optimized separately. For example, the cost function may be divided into five different parts which are optimized iteratively. Optimization can be performed in a multi-scale way. Additionally, the algorithm can detect occlusion and fill in the motion estimates.

As described in References [2, 3, 8, 10, and 11] different methods try to address the problem of coherence in motion estimation. However, these methods deal with non-linear models and are linearizing only at the numerical optimization step. As a consequence, the methods known in the art can produce convoluted optimization techniques that are slow and inefficient. In addition, these methods can produce over-smoothed results that lack the detailed boundaries of optical flow equivalent methods. This effect is due to the compromises performed in the numerical optimization. In the present disclosure, a linear model is employed, extending the techniques of Reference [6] to the scene flow framework. The methods of the present disclosure do not compromise the model accuracy in the numerical optimization stage.

In optical flow, generally an underlying assumption is that the same point in two consecutive time instants has the same intensity value at corresponding pixel locations. In scene flow, the same assumption applies but is generalized to the left and right channels. As discussed above and as visible in FIG. 1, the methods of the present disclosure can parametrize the scene flow by the optical flow in the left channel and the disparity at time t and t+1. In addition, it is assumed that the stereo image sequence is rectified, so that there is only horizontal motion between the left/right image pairs. The person skilled in the art will understand that the methods of the present disclosure could be generalized to cases where the image sequence is not rectified. For example, the image sequence could first be rectified before applying the motion estimation methods. The 3-D reconstruction of the point can be recovered at the two time instants using d for t=0 and u,v,d' for t=1. The scene flow can be computed by taking the difference between the two positions.

In some embodiments, $I_{l,0}$, $I_{l,1}$, $I_{r,0}$, $I_{r,1}$ denote the left/right images at time instants 0,1, where for simplicity it is assumed that t=0. The constraints as discussed above and as illustrated in FIG. 1 can be written as:

$$I_{l,1}(x+u,y+v)=I_{l,0}(x,y) \quad (5)$$

$$I_{r,0}(x+d,y)=I_{l,0}(x,y) \quad (6)$$

$$I_{r,1}(x+u+d',y+v)=I_{l,1}(x+u,y+v) \quad (7)$$

$$I_{r,1}(x+u+d',y+v)=I_{r,0}(x+d,y) \quad (8)$$

where the variables have been explained above in the present disclosure. It can be noted that I(x,y) refers to the intensity value of an image at the pixel location (x,y).

Equations (5) to (8) assume that the left and right channels have been registered and that there is no vertical movement between left and right. The initial estimates for the four variables can be termed as $u_0$, $v_0$, $d_0$' do for u, v, d, d' respectively. Using Taylor series expansion the following expressions can be obtained.

For the left optical flow:

$$I_{l,0}(x,y)=I_{l,1}(x+u,y+v)=I_{l,1}(x+u_0+u-u_0,y+v_0+v-v_0) \quad (9)$$

which can be approximated to $$I_{l,1}(x+u_0, y+v_0) + (u-u_0 \ v-v_0)\begin{pmatrix} I_{l,1_x}(x+u_0, y+v_0) \\ I_{l,1_y}(x+u_0, y+v_0) \end{pmatrix} \quad (10)$$

Setting $I_{l,1}^w \triangleq I_{l,1}(x+u_0, y+v_0)$ and $I_{t,l} \triangleq I_{l,1}^w - I_{l,0}$ it is possible to calculate the residual $\rho_l$. In some embodiments, the residual $\rho_l$ can be defined as $$\rho_l(u,v) \triangleq I_{l,1}(x+u_0,y+v_0)-I_{l,0}(x,y)+(u-u_0,v-v_0)^T \quad (11)$$

$$\nabla I_{l,1}(x+u_0,y+v_0)=I_{t,l}(x,y)+(u-u_0)I_{l,1_x}^w(x,y)+(v-v_0)I_{l,1_y}^w(x,y)\approx 0 \quad (12)$$

where $I_{t,l}(x,y) \triangleq I_{l,1}(x+u_0,y+v_0)-I_{l,0}(x,y)$ and $I_{l,1}^w = I_{l,1}(x+u_0, y+v_0)$.

Therefore, continuing from Equation (10) in view of Equations (11) and (12), the residual $\rho_l$ can be calculated as $$\rho_l(u, v) = \quad (13)$$

$$I_{t,l} + (u-u_0 \ v-v_0)\begin{pmatrix} I_{l,1_x}^w \\ I_{l,1_y}^w \end{pmatrix} = I_{t,l} + (u-u_0)I_{l,1_x}^w + (v-v_0)I_{l,1_y}^w$$

which is approximately zero. For the disparity at time t=0, $$I_{l,0}(x, y) = I_{r,0}(x+d, y) = I_{r,0}(x+d_0+d-d_0,y) \quad (14)$$

$$= I_{r,0}(x+d_0, y) + (d-d_0 \ 0)\begin{pmatrix} I_{r,0_x}(x+d_0, y) \\ I_{l,0_y}(x+d_0, y) \end{pmatrix} \quad (15)$$

Setting $I_{r,0}^w \triangleq I_{r,0}(x+d_0,y)$ and $I_d \triangleq I_{r,0}^w - I_{l,0} \cdot I_{t,l} \triangleq I_{l,1}^w - I_{l,0}$ it is possible to calculate the residual $\rho_d$. In some embodiments, the residual $\rho_d$ can be calculated as $$\rho_d(d)=I_d+(d-d_0)I_{r,0_x}^w \quad (16)$$

which is approximately zero. For the disparity at time t+1, $$I_{r,1}(x+u+d', y+v) = I_{l,1}(x+u, y+v) \quad (17)$$

$$I_{r,1}(x+u_0+d_0'+u-u_0+d'-d_0', y+v_0+v-v_0) = \quad (18)$$
$$I_{l,1}(x+u_0+u-u_0, y+v_0+v-v_0)$$

$$I_{r,1}^w + \begin{pmatrix} u-u_0+d'-d_0' \\ v-v_0 \end{pmatrix}^T \begin{pmatrix} I_{r,1_x}^w \\ I_{r,1_y}^w \end{pmatrix} = I_{l,1}^w + \begin{pmatrix} u-u_0 \\ v-v_0 \end{pmatrix}^T \begin{pmatrix} I_{l,1_x}^w \\ I_{l,1_y}^w \end{pmatrix}, \quad (19)$$

where $I_{r,1}^w = I_{r,1}(x+u_0+d_0',y+v_0)$. Setting $I_{d'} \triangleq I_{r,1}^w - I_{l,1}^w$ In it is possible to calculate the residual $\rho_{d'}$. In some embodiments, the residual $\rho_{d'}$ can be calculated as $$\rho_{d'}(u, v, d') = I_{d'} + \begin{pmatrix} u-u_0 \\ v-v_0 \end{pmatrix}^T \begin{pmatrix} I_{r,1_x}^w - I_{l,1_x}^w \\ I_{r,1_y}^w - I_{l,1_y}^w \end{pmatrix} + (d'-d_0')I_{r,1_x}^w \quad (20)$$

$$= I_{d'} + \begin{pmatrix} u-u_0 \\ v-v_0 \end{pmatrix}^T \begin{pmatrix} I_{d'_x} \\ I_{d'_y} \end{pmatrix} + (d'-d_0')I_{r,1_x}^w. \quad (21)$$

Therefore, for the right optical flow the following expression is obtained:

$$I_{r,1}(x+u+d', y+v) = I_{r,0}(x+d, y) \quad (22)$$

$$I_{r,1}^w + \begin{pmatrix} u-u_0+d'-d_0' \\ v-v_0 \end{pmatrix}^T \begin{pmatrix} I_{r,1_x}^w \\ I_{r,1_y}^w \end{pmatrix} = I_{r,0}^w + \begin{pmatrix} d-d_0 \\ 0 \end{pmatrix}^T \begin{pmatrix} I_{r,0_x}^w \\ I_{r,0_y}^w \end{pmatrix}. \quad (23)$$

Setting $I_{t,r} \triangleq I_{r,1}^w - I_{r,0}^w$ it is possible to calculate the residual $\rho_r$. In some embodiments, the residual $\rho_r$ can be calculated as $$\rho_r(u, v, d, d') = \quad (24)$$

$$I_{t,r} + \begin{pmatrix} u-u_0 \\ v-v_0 \end{pmatrix}^T \begin{pmatrix} I_{r,1_x}^w \\ I_{r,1_y}^w \end{pmatrix} + (d'-d_0')I_{r,1_x}^w - (d-d_0)I_{r,0_x}^w,$$

which is approximately zero.

In some embodiments, the data term $E_{data}$ can be written as in Equation (3):

$E_{data} = E_l + E_r + E_d + E_{d'}$ where $$E_l = \lambda_l \Sigma_{(x',y') \in reg(x,y)} w_l \rho_l(u,v)^2 \tag{25}$$

$$E_r = \lambda_r \Sigma_{(x',y') \in reg(x,y)} w_r \rho_r(u,v,d,d')^2 \tag{26}$$

$$E_d = \lambda_d \Sigma_{(x',y') \in reg(x,y)} w_d \rho_d(d)^2 \tag{27}$$

$$E_{d'} = \lambda_{d'} \Sigma_{(x',y') \in reg(x,y)} w_{d'} \rho_{d'}(u,v,d')^2 \tag{28}$$

The w terms are weight for the pixels in the local neighborhood of the pixel under consideration, as understood in the context of Lucas-Kanade methods. The λ terms are weights for each term of equations (25) to (28). For example, the weights can be used to prioritize one term more than the other, so that one or more term has more influence in the calculation relative to the other terms. For example, optical flow terms can be given a higher weight than the disparity terms.

The smoothness term $E_{smooth}$ can be written as in Equation (4):

$E_{smooth} = \|D\nabla u\|_{TV} + \|D\nabla v\|_{TV} + \|D\nabla d\|_{TV} + \|D\nabla(d')\|_{TV}$ Combining the equations above, and according to Equation (2), in some embodiments the overall model can be described by the following equations.

$$E_{CLG-TV-SF} = \tag{29}$$
$$\int_\Omega \lambda_l \sum_{(x',y') \in reg(x,y)} w_l \rho_l(u,v)^2 + \lambda_r \sum_{(x',y') \in reg(x,y)} w_r \rho_r(u,v,d,d')^2 +$$
$$\lambda_d \sum_{(x',y') \in reg(x,y)} w_d \rho_d(d)^2 + \lambda_{d'} \sum_{(x',y') \in reg(x,y)} w_{d'} \rho_{d'}(u,v,d')^2 + \|$$
$$D\nabla u\|_{TV} + \|D\nabla v\|_{TV} + \|D\nabla d\|_{TV} + \|D\nabla(d')\|_{TV} \, dxdy$$

$$E_{CLG-TV-SF-1} = \tag{30}$$
$$\int_\Omega \lambda_l \Sigma_{(x',y') \in reg(x,y)} w_l \rho_l(\hat{u}, \hat{v})^2 + \lambda_r \sum_{(x',y') \in reg(x,y)} w_r \rho_r(\hat{u}, \hat{v}, \hat{d}, \hat{d}')^2 +$$
$$\lambda_d \sum_{(x',y') \in reg(x,y)} w_d \rho_d(\hat{d})^2 + \lambda_{d'} \sum_{(x',y') \in reg(x,y)} w_{d'} \rho_{d'}(\hat{u}, \hat{v}, \hat{d}')^2 +$$
$$\frac{1}{2\vartheta_u}(u-\hat{u})^2 + \frac{1}{2\vartheta_v}(v-\hat{v})^2 + \frac{1}{2\vartheta_d}(d-\hat{d})^2 + \frac{1}{2\vartheta_{d'}}(d'-\hat{d}')^2 dxdy$$

$$E_{CLG-TV-SF-2} = \int_\Omega \frac{1}{2\vartheta_u}(u-\hat{u})^2 + \|D\nabla u\|_{TV} \, dxdy \tag{31}$$

$$E_{CLG-TV-SF-3} = \int_\Omega \frac{1}{2\vartheta_v}(v-\hat{v})^2 + \|D\nabla v\|_{TV} \, dxdy \tag{32}$$

$$E_{CLG-TV-SF-4} = \int_\Omega \frac{1}{2\vartheta_d}(d-\hat{d})^2 + \|D\nabla d\|_{TV} \, dxdy \tag{33}$$

$$E_{CLG-TV-SF-5} = \int_\Omega \frac{1}{2\vartheta_{d'}}(d'-\hat{d}')^2 + \|D\nabla(d')\|_{TV} \, dxdy \tag{34}$$

Where TV stands for total variation. As discussed above, the methods of the present disclosure utilize four variables as illustrated, for example, in FIG. 1. In some embodiments, to optimize the scene flow and the optical flow method with four unknown variables, the following quantities can be defined.

$$\rho_{0,l} \triangleq I_{t,l} - I_{l,1_x}^w u_0 - I_{l,1_y}^w v_0 \tag{35}$$

$$\rho_{0,r} \triangleq I_{t,r} - I_{r,1_x}^w u_0 - I_{r,1_y}^w v_0 + I_{r,0_x}^w d_0 - I_{r,1_x}^w d_0' \tag{36}$$

$$\rho_{0,d} \triangleq I_d - I_{r,0_x}^w d_0 \tag{37}$$

$$\rho_{0,d'} \triangleq I_{d'} - I_{d'_x}^w u_0 - I_{d'_y}^w v_0 - I_{r,1_x}^w d_0' \tag{38}$$

As understood by the person skilled in the art, based on the equations above, standard methods can be applied for the numerical optimization, using the Euler-Lagrange equations. Similarly to optical flow methods known in the art, the optimization can be performed in a coarse-to-fine manner with the warping technique employed.

In addition to the determination of coherent motion estimates for images, the methods of the present disclosure can take into account the presence of occluded pixels. Occluded pixels are pixels which are visible in one channel but not in the other. For example, a pixel may be visible in the left channel but not be visible (occluded) in the right channel.

Generally, optical flow at occluded pixel locations can be unreliable since the optical flow assumption is no longer valid. Occlusion can cause problems in the optimization, since the estimated motion vectors are propagated through the bilateral filtering and the summation over local neighborhoods due to the usage of the Lucas/Kanade approach. In the present disclosure, occlusion handling is introduced for both the optical flow and scene flow cases. As part of the method, a mapping uniqueness criterion can be used as described in Reference [12]. The mapping uniqueness criterion can be given by $$o(x,y) = T_{0,1}(f(x+u, y+v) - 1) \tag{39}$$

where f(x+u,y+v) counts the pixels mapped to (x+u,y+v). The function $T_{l,h}(a)$ truncates the value of a if it is outside the range [l,h]. The mapping uniqueness criterion computes a binary map that indicates which pixels are mapped to pixel locations in the next frame that are occupied by more than one candidate. Therefore, whenever o(x,y)≥1 the pixel (x,y) is marked as occluded. Typically this method can increase the occluding boundary, but it is unlikely to miss actual occluded pixels.

An occlusion detection algorithm similar to Reference [12] can be used, introducing a measure of the data confidence given by:

$$c_l(x,y) = \max(1 - o(x,y), 0.01), \tag{40}$$

where the value 0.01 ensures that $c_l(x,y)$=is greater than 0. Similar expressions can apply for $c_r$, $c_d$ and $c_{d'}$. The data term of the cost function can be modified to:

$$E_{data-occ} = c_l E_l + c_r E_r + c_d E_d + c_{d'} E_{d'} \tag{41}$$

In some embodiments, four occlusion masks are required, one for each constraint in the scene flow, since certain pixels could be occluded in one pair of images, but not occluded in another.

The methods of the present disclosure, for coherent motion estimation and occlusion handling, can be applied to dejuddering purposes. For dejuddering applications, the optical flow for both left and right channels can be calculated. In some embodiments, the method computes a right optical flow that is warped on the left image at t=0. In order to recover the right optical flow, several steps would need to be taken, such as applying an inverse disparity operation. Even after the inverse disparity operation, pixels that are present in the right images, but are occluded in the left image would have an interpolated optical flow that would be less precise. Furthermore, the overall warping of the right optical flow on the lattice of the right image is generally less precise than simply computing the right optical flow on the actual lattice. This would result in a degraded quality for the right optical flow. As a consequence, it is more advantageous to use the scene flow algorithm described above to compute the left optical flow and then reverse the channels and repeat the same procedure for the right channel, computing the right optical flow. This method allows the achievement of higher accuracy results, due to computing the scene flow algorithm centered on each channel.

To measure the coherence and accuracy of the left/right optical flow estimation an evaluation criterion can be used, as explained earlier (see Equation (1)), averaged over all pixels. Minimizing W as in Equation (1):

$$W = \|e_l\|^2 + \|e_r\|^2 + \|e_d\|^2$$

is equivalent to minimizing the expression:

$$\hat{W} = \|e_l\|^2 + \|e_r\|^2 - \|e_l^T e_r\|^2 \tag{42}$$

Experiments carried out using the methods described above show improvements over the prior art. As described above, the present disclosure is aimed at the problem of estimating coherent motion estimation for stereoscopic video sequences. An important application of this problem is dejuddering of stereo sequences that require estimation of the optical flow in the left and right channels. Inconsistent estimates create unnatural artifacts when interpolating frames in the two channels, hence a coherent motion estimation method is advantageous to minimize those effects. The methods described herein are based on the scene flow framework. As described above, the scene flow can be parametrized in the image domain and the parameters can be estimated using an extension of the methods described in Reference [6]. In addition, occlusion handling has been described.

In the present disclosure, some methods may be applied shot by shot. As known to the person skilled in the art, there is a finer level of distinction that describes scene-cuts, and camera angle cuts (which are usually during the same scene). Shot is a term that can comprise both scene cuts and camera angle cuts.

In the present disclosure, additional steps may be taken which comprise providing, by a computer, at least two images; calculating, by a computer, a judder map, wherein the judder map comprises judder information for at least one pixel of the at least two images; and processing the at least one pixel based on the judder map. In some embodiments, the methods of the present disclosure may comprise generating judder metadata and applying, by a computer, judder control to the video frames for which motion estimation has been calculated, based on the judder metadata.

Processing of the at least one pixel may comprise processing of a region of an image, formed by several pixels. Processing may comprise applying different video processing techniques, and different techniques, or the same technique with different parameters may be applied to different pixels, based on the judder information on that pixel contained in the judder map.

Figure 2:
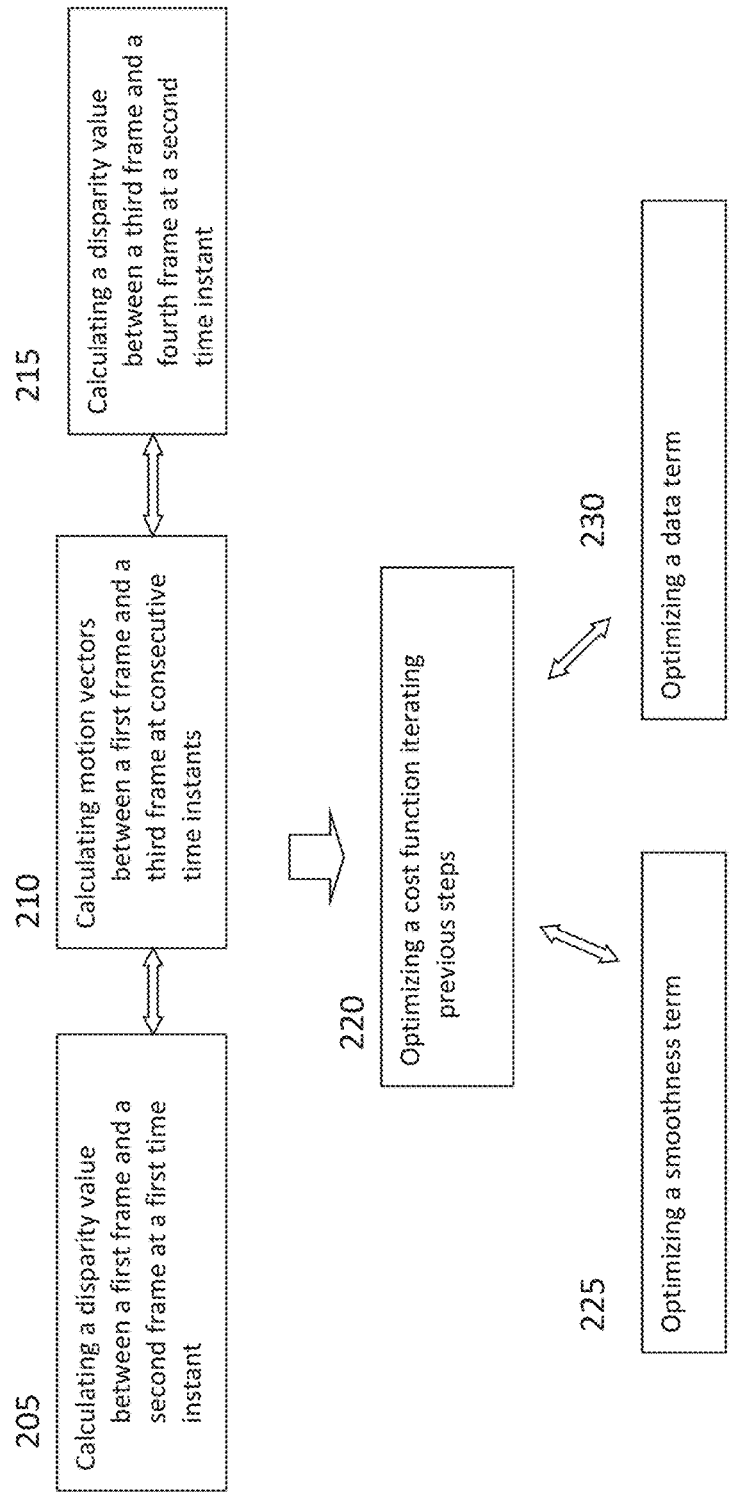
FIG. 2 illustrates an exemplary flowchart for a method of the present disclosure.

In some embodiments, the methods of the present disclosure are carried out as illustrated in FIG. 2, where in a first step, the two disparity values and motion vectors are calculated (205, 210, 215). For example, the disparity value between two video frames at a first time instant, a first and a second video frames, is calculated (205). A disparity value between two video frames at a second time instant, a third and a fourth video frames, is calculated (215). Motion vectors between the two time instants are calculated (210), for example between the first video frame and the third video frame. A cost function is then optimized, iterating the previous step (220). The cost function may comprise a data term (230) and a smoothness term (225), as discussed above. In some embodiments, the values necessary for implementation of the methods of the present disclosure can be stored into memory locations. For example, the disparity values and motion parameters may be stored in four different memory locations.

Figure 3:
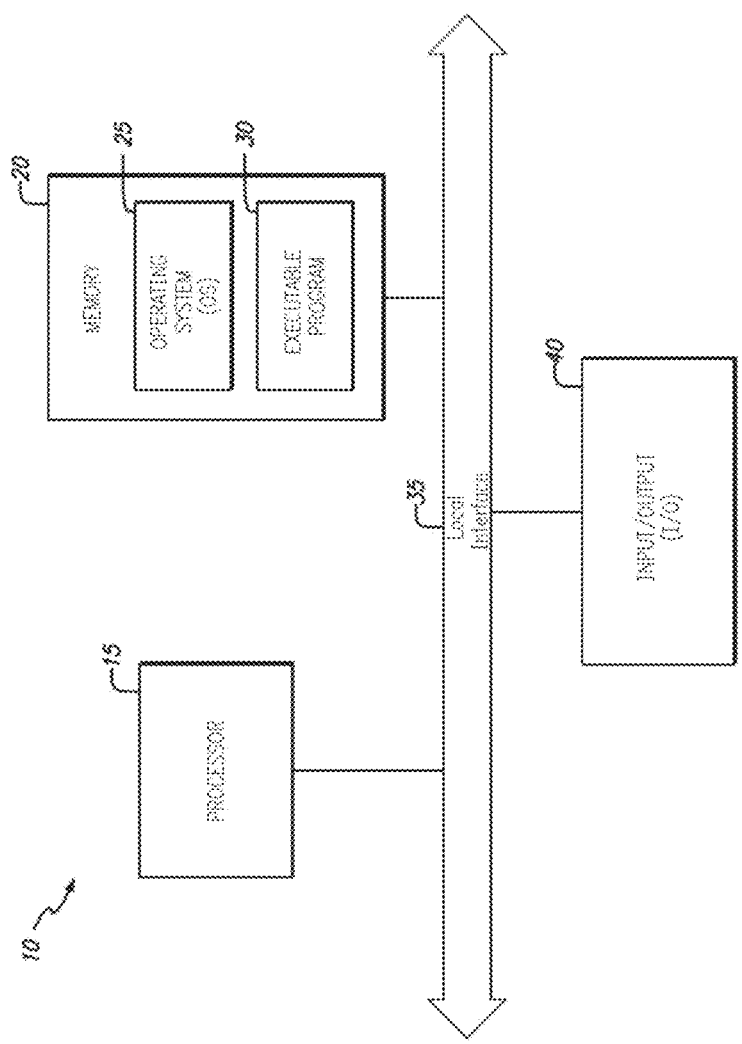
FIG. 3 illustrates an embodiment of a hardware implementation for the methods of the present disclosure.

FIG. 3 is an exemplary embodiment of a target hardware (10) (e.g., a computer system) for implementing the embodiments of FIGS. 1-2. This target hardware comprises a processor (15), a memory bank (20), a local interface bus (35) and one or more Input/Output devices (40). The processor may execute one or more instructions related to the implementation of FIGS. 1-2, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 3. In some embodiments a plurality of processors may be used in a parallel configuration for added execution speed. In such a case, the executable program may be specifically tailored to a parallel execution. Also, in some embodiments the processor (15) may execute part of the implementation of FIGS. 1-2, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose (GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] S. Baker, D. Scharstein, J. P. Lewis, S. Roth, M. J. Black, and R. Szeliski. A database and evaluation methodology for optical flow. International Journal of Computer Vision, 2011.

[2] T. Basha, Y. Moses, and N. Kiryati. Multi-view scene flow estimation: A view centered variational approach. Conference on Computer Vision and Pattern Recognition, 2010.

[3] T. Brox, A. Bruhn, N. Papenberg, and J. Weickert. High accuracy optical flow estimation based on a theory for warping. European Conference on Computer Vision, 2004.

[4] A. Bruhn, J. Weickert, and C. Schnorr. Lucas/Kanade meets Horn/Schunck: Combining local and global optic flow methods. International Journal of Computer Vision, 2005.

[5] A. Chambolle. An algorithm for total variation minimization and applications. Journal of Mathematical Imaging and Vision, 2004.

[6] M. Drulea and S. Nedevschi. Total variation regularization of local-global optical flow. In International Conference on Intelligent Transportation Systems, 2011.

[7] B. K. P. Horn and B. G. Schunck. Determining optical flow. Artificial Intelligence, 1981.

[8] Frederic Huguet and Frederic Devernay. A variational method for scene flow estimation from stereo sequences. International Conference on Computer Vision, 2007.

[9] B. Lucas and T. Kanade. An iterative image registration technique with an application to stereo vision. International Joint Conferences on Computer Vision, 1981.

[10] S. Vedula, S. Baker, P. Rander, R. Collins, and T. Kanade. Three-dimensional scene flow. In International Conference on Computer Vision, 1999.

[11] A. Wedel, C. Rabe, T. Vaudrey, T. Brox, U. Franke, and D. Cremers. Efficient dense scene flow from sparse or dense stereo data. European Conference on Computer Vision, 2008.

[12] Li Xu, Jiaya Jia, and Yasuyuki Matsushita. Motion detail preserving optical flow estimation. Transactions on Pattern Analysis and Machine Intelligence, 2012.

[13] C. Zach, T. Pock, and H. Bischof. A duality based approach for realtime TV-L1 optical flow. Proceedings of the 29th DAGM conference on Pattern recognition. 2007.

What is claimed is:

1. A method to estimate motion of pixels in an image pair with a computer, the method comprising:
providing, by a computer, a first and a second video frame at a first time value, the first and the second video frames forming a stereoscopic image at the first time value;
generating, by a computer and for at least one pixel, a first disparity value for the at least one pixel between the first and second video frames;
storing the first disparity value in a first memory location;
generating two motion vector parameters for the at least one pixel between the first and second video frames and a third and a fourth video frame at a second time value, the third and the fourth video frames forming a stereoscopic image at the second time value;
storing the two motion vector parameters in a second memory location;
generating a second disparity value for the at least one pixel between the third and fourth video frames at the second time value;
storing the second disparity value in a third memory location;
estimating a coherent motion of the at least one pixel, based on the first disparity value, the two motion vector parameters, and the second disparity value; and
storing estimated coherent motion values in a fourth memory location,
wherein the estimating a coherent motion of the at least one pixel comprises minimizing a cost function,
wherein the cost function comprises a data term and a smoothness term, and
wherein the data term comprises a sum of estimated errors in the two motion vector parameters and an error in the first and second disparity values; and
wherein the data term comprises two disparity terms and two optical flow terms each having weight terms associated with them, said weight terms having different values for the two disparity terms and different values for the two optical flow terms.

2. The method of claim 1, wherein the first and second disparity values are for a horizontal direction.

3. The method of claim 1, wherein the second time value is consecutive with the first time value.

4. The method of claim 1, wherein the first video frame is a left video frame and the second video frame is a right video frame.

5. The method of claim 1, wherein the two motion vector parameters are a first motion vector parameter for a horizontal direction and a second motion vector parameter for a vertical direction.

6. The method of claim 1, wherein the cost function estimates an error in the two motion vector parameters, and an error in the first and second disparity values.

7. The method of claim 1, wherein the smoothness term comprises minimizing a gradient for the two motion vector parameters and the first and second disparity values.

8. The method of claim 7, wherein the minimizing a cost function comprises separating the cost function into a plurality of functions and iteratively minimizing the plurality of functions.

9. The method of claim 1, wherein the estimating a motion of the at least one pixel comprises:
   generating in a single step, by a computer and for at least one pixel, the first disparity value, the two motion vector parameters and the second disparity value; and
   iteratively repeating the generating in a single step, based on results of a previous step.

10. The method of claim 9, further comprising terminating the iteratively repeating when a desired number of iterations has been reached.

11. The method of claim 9, further comprising terminating the iteratively repeating when a desired value for the cost function has been obtained.

12. The method of claim 1, further comprising generating judder metadata and applying, by a computer, judder control to the first, second, third and fourth video frames based on the judder metadata.

13. The method of claim 1, further comprising detecting occluded pixels in the first, second, third or fourth video frames.

14. The method of claim 13, further comprising generating an occlusion mask for each of the first and second disparity values and for the two motion vector parameters.

15. The method of claim 1, further comprising generating an optical flow for the first and third video frames and for the second and fourth video frames.

16. The method of claim 1, further comprising applying, by a computer, judder control to the first, second, third and fourth video frames, said judder control being based on at least the estimated coherent motion.

17. An apparatus to estimate motion comprising:
   a display, configured to receive video frames;
   a motion estimation device, configured to estimate motion according to the method of claim 1; and
   communication means between the display and the motion estimation device, wherein the motion estimation device comprises:
   a processor that estimates motion;
   a first memory for storing the first disparity value;
   a second memory for storing the two motion vector parameters;
   a third memory for storing the second disparity value; and
   a fourth memory for storing estimated motion values.

* * * * *